United States Patent [19]

Watts

[11] Patent Number: 5,190,120
[45] Date of Patent: Mar. 2, 1993

[54] FLUSHING APPARATUS FOR VEHICLE OIL PUMP PICKUP TUBE AND SCREEN

[76] Inventor: Dion M. Watts, 11649 Faust, Detroit, Mich. 48228

[21] Appl. No.: 709,325

[22] Filed: Jun. 3, 1991

[51] Int. Cl.⁵ .............................................. F16N 33/00
[52] U.S. Cl. ...................................... 184/1.5; 184/55.1; 123/196 A; 123/196 R; 134/22.12; 134/169 A; 134/95.1
[58] Field of Search ............... 134/10, 22.12, 22.11, 134/169 A, 169 R, 169 C, 95; 184/1.5, 6.24, 55.1; 123/196 R, 196 A; 210/411, 410, 409

[56] References Cited

U.S. PATENT DOCUMENTS

| | | | |
|---|---|---|---|
| 1,699,680 | 1/1929 | Sweetland . | |
| 1,866,970 | 7/1932 | Garland et al. . | |
| 2,365,766 | 12/1944 | Levier | 210/183 |
| 2,400,200 | 5/1946 | Katcher | 210/167 |
| 2,635,756 | 4/1953 | Grieve et al. | 210/52 |
| 4,171,034 | 10/1979 | Gallant | 308/187 |
| 4,276,914 | 7/1981 | Albertson | 134/169 A |
| 4,534,802 | 8/1985 | Gates et al. | 134/22.12 |
| 4,586,875 | 5/1986 | Aman, Jr. | 417/228 |
| 4,606,363 | 8/1986 | Scales | 134/169 A |
| 4,909,205 | 3/1990 | Bewley, III | 184/105.1 |
| 4,941,971 | 7/1990 | Albright | 134/169 A |
| 4,951,784 | 8/1990 | Bedi | 184/1.5 |
| 4,967,776 | 11/1990 | Folmar | 134/95 |
| 4,991,608 | 2/1991 | Schweiger | 134/169 A |
| 5,063,896 | 11/1991 | Hyatt et al. | 134/169 A |
| 5,070,831 | 12/1991 | Yunick | 123/196 A |

Primary Examiner—Ira S. Lazarus
Assistant Examiner—Alan B. Cariaso
Attorney, Agent, or Firm—Dykema Gossett

[57] ABSTRACT

In combination with a vehicle engine having a crankcase, a pan with drain plug, an oil pump mounted upon the crankcase having an inlet and an outlet, and a filter mount boss. A pickup tube in the crankcase at one end is connected to the pump inlet and at its other end having an intake near the bottom of the pan and containing an oil screen. A reservoir containing a flushing fluid has an outlet pipe. A pressurized air source is connected to the outlet pipe. An adapter on the outlet pipe is mounted upon the filter mount boss on the oil pump and connected to its outlet for feeding flushing fluids through the pump and through the pickup tube and its screen in the reverse direction to clean out the intake filter.

8 Claims, 1 Drawing Sheet

FLUSHING APPARATUS FOR VEHICLE OIL PUMP PICKUP TUBE AND SCREEN

FIELD OF THE INVENTION

The invention relates to the flushing out of the oil pickup tube and filter for a vehicle oil pump.

BACKGROUND OF THE INVENTION

Previously, when the conventional oil filter connected to the vehicle oil pump becomes clogged or dirty, it is time for a filter change and/or additionally an oil change. The accumulated oil in the crankcase and pan is drained and a replacement conventional oil filter is reapplied to the crankcase. After that the crankcase is refilled with lubricating oil.

Earlier in the art, in some situations, since it was the cartridge of the filter which became impacted with dirt and sediment, it has been known to remove and replace the cartridge and reassemble the filter upon an outlet portion of the fuel pump. This is for the normal functioning and circulation of pressurized oil from the oil pump to the filter and subsequent delivery to the vehicle engine.

Earlier in the art, the filtration mechanism for the vehicle engine was removed, cleaned out or flushed out, a new filtration apparatus installed. Alternately a means has been applied for cleaning out the existing filter.

Previously, in connection with the operation of oil pumps engine driven, and in the use of a conventional pickup tube in the crankcase and extending down into the oil pan adjacent its bottom, there has been employed an intake with a screen therein. From time to time, the screen in the intake tube becomes clogged with sediment and dirt particles to such extent that it is necessary to remove the pan and to either replace the intake tube or to otherwise mechanically clean it out or replace its screen.

Prior art efforts in connection with filtration devices for vehicles and the like, are shown in one or more of the following United States patents:

| THE PRIOR ART | | |
|---|---|---|
| 1,699,680 | E. J. Sweetland | January 22, 1929 |
| 1,866,970 | C. S. Garland, et al. | July 12, 1932 |
| 2,365,766 | J. M. Levier | December 26, 1944 |
| 2,400,200 | M. Katcher | May 14, 1946 |
| 2,635,756 | G. P. Grieve, et al. | April 21, 1953 |
| 4,171,034 | J. O. Gallant | October 16, 1979 |
| 4,586,875 | R. C. Aman, Jr. | May 6, 1986 |

SUMMARY OF THE INVENTION

An important feature of the present invention is to provide an improved means for cleaning out the pickup tube for a vehicle engine oil pump and wherein it is not necessary to remove the oil pan for access thereto.

Another feature is to provide access to the pickup tube without removal of the oil pan and wherein after the oil has been drained from the crankcase and pan, and the conventional oil filter removed, there is provided a means for delivering a pressurized flushing fluid, such as diesel oil, back through the oil pump in the reverse direction through the pickup tube to its intake and the screen therein flushing out said intake tube and said screen.

As another feature, the flushing fluid is delivered under pressure in the reverse direction through the pickup tube and drains from the pan into a suitable collector.

As another feature, the pressurization of the flushing fluid or liquid or diesel fuel includes the use of a reservoir mounted upon a floor surface having an outlet pipe which communicates with the flushing fluid upon the interior of said reservoir. Said fluid is controlled by a valve for feeding pressurized flushing fluid through the outlet pipe. The reservoir is pressurized by the connection of a pressurized air source thereto, and particularly to the outlet pipe. A hand valve controls the flow of pressurized air and for shutting it off. The outlet pipe has an adapter which is connected to the mount flange upon the oil pump. The pressurized flushing fluid is directed into the pumping chamber of the oil pump, and flows in the opposite direction through the pickup tube through the intake thereon and the screen therein to the pan completing the flushing out of said intake tube. All of this is done without removal of the pan.

As another feature of the present invention, there is provided upon the oil pump, a conventional mount flange and an apertured mount boss to which, in a conventional manner, the usual oil filter is attached and wherein pressurized oil from the oil pump is normally delivered to the filter for circulation therethrough and returned back into the oil pump and through an additional conduit for direction of pressurized oil to the vehicle engine. The oil ultimately drains back from the crankcase to the pan.

As a further feature of the present invention, with the removal of the conventional filter after the crankcase and pan have been drained an adapter is mounted over the end of a feed pipe from a reservoir and which is of such construction as to supportably fit over the existing apertured mount boss upon the oil pump. The pressurized fluid with the pump inactive, flows back through the pumping chamber, through the oil pump inlet, and in a reverse direction through the pickup tube and through its intake and corresponding screen therein for the complete flushing out of the pickup tube and its screen and drained from the pan.

As another feature, the used flushing fluid, such as diesel fuel, may be pumped back through a filter and piping back into the reservoir for reuse as desired.

These and other features and objects will be seen from the following specification and claims in conjunction with the appended drawing.

THE DRAWING

It is will be understood that the above drawing is illustrative of one embodiment of the invention, and that other embodiments are contemplated within the scope of the claims hereafter set forth.

DESCRIPTION OF AN EMBODIMENT OF THE INVENTION

Figure 1:
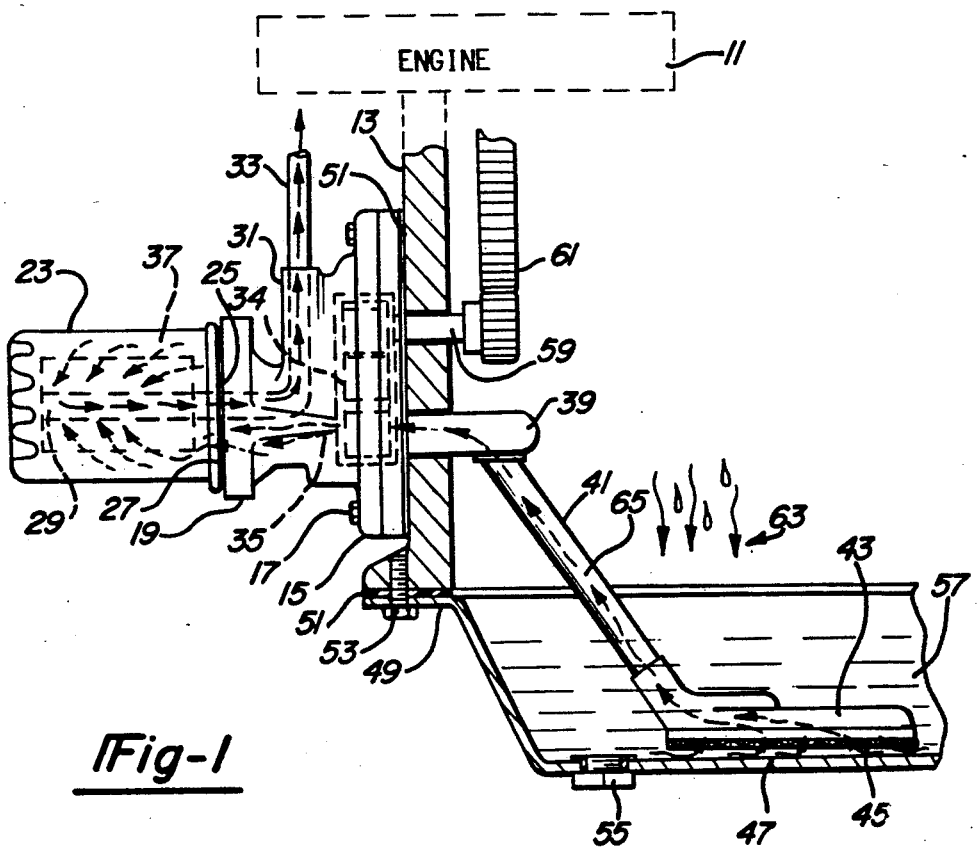
FIG. 1 is a fragmentary and schematic cross-sectional view of a portion of a vehicle engine including its crankcase and pan, oil pump and connected conventional oil filter assembly.

FIG. 1 of the drawing is a fragmentary schematic illustration of an internal combustion engine or vehicle engine 11 which includes a crank case 13, fragmentarily shown, upon which is mounted and sealed oil pump 15, of a conventional construction. Said pump is secured to the crankcase by plurality of fasteners 17 with intermediate gasket 51.

Oil pump 15 includes an apertured mount flange 19. Said flange has an outwardly extending threaded mount boss 21, FIG. 2, sometimes referred to as a filter mount boss 21. A conventional filter 23 has a central threaded outlet 25 which is removably threaded onto mount boss 21. As is conventional there is an annular seal 27 between removable filter 23 and mount flange 19. Said filter is snugly threaded onto the filter mount boss 21 and is self-supporting.

The present conventional filter 23 includes a central filter outlet passage 29, FIG. 1, which communicates with mount boss 21.

In normal operation of oil pump 15 filtered oil from passage 29 flows through pump outlet 31 and through the conduit 33, fragmentarily shown, to the engine 11. The pumping chamber 34, FIG. 1, communicates with pump outlet 35. In normal operation pressurized oil flows through a first passage 77, FIG. 2, in mount flange 19 and communicates with the filter inlets 37. These extend longitudinally of the filter and around its perimeter and are in communication through the internal cartridge to outlet passage 29 of the filter. Pressurized filter oil flows through apertured mount boss 21 to outlet 31. In a conventional manner oil pump 15 has an intake 39. One end of oil pickup tube 41 is connected to oil pump intake 39 within the crankcase 13, fragmentarily shown.

Connected to the other end of pickup tube 41 is an oil intake 43 which extends into the oil 57 within pan 47 and encloses therein a conventional intake screen 45. Said screen and the enclosing oil intake 43 is arranged closely adjacent to but spaced from the bottom of pan 47. Intake 43 through the action of oil pump 15 picks up oil from the bottom of oil pan 47 which includes drain plug 55.

Pan 47 includes the peripheral mount flange 49 which bears against corresponding peripheral portions of crankcase 13, with a suitable sealing gasket 51 therebetween and is secured thereto by a plurality of spaced fasteners 53.

Oil pump 15 has the usual drive shaft 59 connected to a gear train 61 connected to the vehicle engine in a conventional manner. Oil returned from its lubrication function within the engine 11 as designated by dash lines 63 accumulates within the pan at 57.

During operation of oil pump 15, the normal flow of oil from crankcase 13 and pan 47 through pickup tube 41 is in the direction of arrows 65 to intake 39 and to pumping chamber 34. Pressurized oil flows through pump outlet 35 in a conventional manner for delivering oil through passages 77 to filter passages 37.

The foregoing description with respect to FIG. 1 schematically shows one of the conventional assemblies in the combination with the vehicle engine and crankcase of the oil pump 15, the conventional filter 23 and its mount thereon together with the standard pickup tube 41 having intake 43 and its screen 45.

The problem solved by the present invention is the clean-out of the pickup tube 65 and its attached screen 45 from time-to-time as it becomes clogged with sediment and dirt collected from continuous use. The objective is to clean out the pickup tube and screen 45 without removal of pan 47 and saving the time which this would require.

Figure 2:
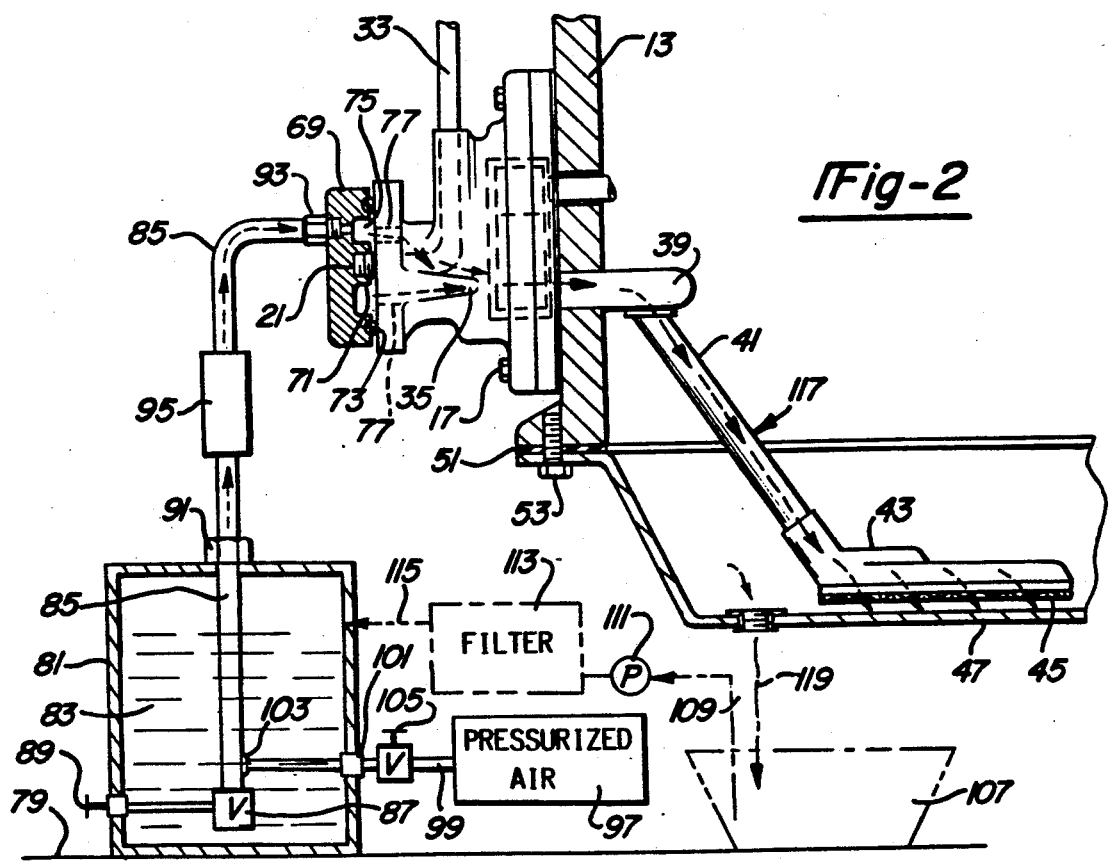
FIG. 2 is a similar view with a conventional filter removed and a pressurized reservoir containing a flushing fluid having a outlet with an adapter for mounting on and connection to the oil pump outlet for reverse flushing flow of pressurized fluid through the pump pickup tube and associated screen.

The apparatus and method for accomplishing this is disclosed in a similar drawing, FIG. 2. This includes the background parts above-described with respect to FIG. 1. However, the oil 57 has been first drained from pan 47 by removal of plug 55. Thereafter the conventional filter 23 is unthreaded from the filter mount boss 21, FIG. 2.

PICKUP TUBE FLUSHING

Replacing the filter 23, as shown in cross-section, FIG. 2, the present adapter 69, sometimes referred to as adapter means, includes an internal threaded boss 71 which is threaded over filter mount boss 21. An annular gasket or seal 73, of a flexible material such as rubber or the like, is nested within a corresponding groove within adapter 69 in sealing engagement with adjacent surface portions of pump mount flange 19.

Said adapter includes an annular manifold chamber 75 which is in communication with the pump outlets 77. With pump 15 inoperative, pressurized flushing fluid 83 can be delivered through passages 77 to the pump outlet 35.

On the floor surface 79, FIG. 2, there is mounted a tank or reservoir 81 which is closed and contains a body of diesel fuel 83 or other flushing fluid. Upright outlet pipe 85 extends through a fitting 91 at the top of reservoir and terminates adjacent to the bottom of said reservoir. Oil intake valve 87 upon the end of outlet pipe 85 has a hand control 89 for regulating flow of flushing fluid from the reservoir into feed pipe 85.

Intermediate the ends of outlet pipe 85 an additional fitting 95 which maybe employed. The outer end of feed pipe 85 terminates in fitting 93 which is threaded into adapter 69, in communication with its internal manifold chamber 75. This is for the purpose of connecting the outlet pipe 85 to adapter 69 and for pressurizing the manifold chamber 75.

A pressurized air source is schematically shown at 97, FIG. 2. It may be the conventional pressurized air source such as often found in garages and gas stations and the like. It is connected to pipe 99 and by a fitting 101 extends into reservoir 81 to the fitting 103 for connection to outlet pipe 85. This pressurizes said pipe and the fluids therein for feeding pressurized flushing fluid outwardly of pipe 85.

Air pipe 99 includes a control valve 105 for selectively controlling or shutting on or off the flow of pressurized air through outlet pipe 85.

As an additional embodiment of the present invention there is provided a collector 107 on the ground surface 79, shown in dash lines receiving drainage 119 from pan 47 for the flushing oil. If it would be desired to reuse or recirculate the flushing fluids the same may pass through the conduit 109, the pump 111 and through the filter 113, through pipe 115 back to reservoir 81.

In normal operation once the crankcase oil 57 has been drained with the plug 55 removed and the filter 23 removed, FIG. 2, adapter 69 is connected to the same mount boss 21 upon which the filter 23 was mounted. This is for flushing of pickup tube 41 in the reverse direction.

By opening air valve 105, pressurized air is delivered to outlet pipe 85, so that flushing fluids 83 will pass through pipe 85 to the adapter or adapter means 69. The pressurized fluid enters chamber 75 sealed within said adapter and flows through corresponding passages 77 in mount flange 19. These passages normally operate, FIG. 1, provide pressurized oil from oil pump 15 to filter passages 37.

These same passages receive the pressurized flushing fluid or diesel oil from manifold 69 for passage directly into the pump outlet 35 and into pumping chamber 34. The pressurized fluid then flows in a reverse direction 117 through pump intake 39 and, back through pickup tube 41 and through intake 43 and through the enclosed screen 45. This flushes out and cleans said pickup tube and associated screen 45. The accumulated flushing fluid passes through the pan 47 from which plug 55 of FIG. 1 has been removed. The flushing fluid is collected within container 107.

The foregoing apparatus provides a means by which pressurized flushing fluid, such as diesel fuel oil for illustration, may be delivered in a reverse direction through the oil pump outlets, through the pump inlet, and back through pickup tube 41 and its intake 43 and associated screen 45. This flushes out of said pickup tube and filter. This is all accomplished without removal of pan 47.

The present invention includes the method of flushing out a vehicle oil pump pickup tube and filter without removing the crankcase pan which comprises the steps of:

draining the oil from the crankcase and pan;
removing the conventional oil filter from its mount boss;
pressurizing a reservoir containing a flushing fluid and having a connected feed pipe;
mounting an adapter upon said feed pipe and connecting the adapter to said mount boss; and
feeding pressurized flushing fluid through the adapter to and through said pump and through said pickup tube and its screen.

After flushing has been completed, the valve 87, 89 is closed to shut off flow of oil through feed pipe 85. Thereafter, pressurized air at 97 is delivered through the outlet pipe and through manifold 69 and ultimately through the oil pump and through pickup tube 41 in the direction of arrows 117. This dries out the pump, the pickup tube, and the screen 45 and removes any traces of the flushing oil.

After that the plug 55 is replaced as in FIG. 1. The adapter 69 is unthreaded from boss 21, FIG. 2, and a new conventional filter 23 is threaded onto said boss and sealed thereover in the manner shown in FIG. 1. The crankcase and pan are now ready for refilling of lubricating oil and operation in the conventional manner.

Having described my invention, reference should now be had to the following claims.

I claim:

1. In combination a vehicle engine having a crankcase and a pan with a drain plug at its bottom;
an oil pump mounted on said crankcase having an inlet and an outlet;
a filter mount boss on said oil pump;
a pickup tube in said crankcase at one end connected to said oil pump inlet and at its other end having an intake adjacent the bottom of said pan;
a screen retained within said intake;
a reservoir containing a flushing fluid;
an outlet pipe extending from said reservoir and communicating with said fluid;
an air pressure source connected to said outlet pipe for pressurizing said flushing fluid; and
an adapter means on said outlet pipe supported upon said mount boss connecting said outlet pipe to said pump outlet;
whereby flushing fluid under pressure passes through said adapter means and successively through said pump outlet and inlet, through said pickup tube and through said intake screen to flush out impurities therein.

2. In the combination of claim 1, further comprising:
said drain plug being removed, said flushing oil draining from said pan;
a first valve means on said outlet pipe for selectively controlling flow of flushing oil therethrough and selectively stopping the flow;
pressurized air adapted to flow through said outlet pipe for drying out the flushing fluid from said oil pump, pickup tube and oil intake screen.

3. In the combination of claim 2, further comprising a second valve means on said air pressure source for selectively controlling air pressure to said reservoir and outlet pipe.

4. In the combination of claim 1, further comprising:
said filter mount boss being threaded and extending from said oil pump, to which a conventional oil filter is removably sealed; and
said adapter means including a complemental boss threaded onto said filter mount boss and with said adapter means sealed against said oil pump.

5. In the combination defined in claim 4, further comprising said adapter means including a chamber for said flushing fluid communicating with said pump outlet; and
a peripheral seal mounted upon said adapter means enclosing said chamber and engaging said oil pump.

6. In the combination of claim 1, further comprising a apertured mount flange on said oil pump supporting said filter mount boss;
said adapter as mounted upon said filter mount boss being in sealed engagement with said mount flange.

7. In combination a vehicle engine having a crankcase and a pan with a drain plug, an oil pump having a pump chamber, an apertured mount flange including an apertured boss adapted to supportably and removably mount a basic oil filter and receive filtered oil;
first and second outlet passages in said pump, said first outlet passage feeding oil from said pump chamber through said filter, with the filtered oil returning to the pump through said boss and through said second outlet passage to said engine;
a pickup tube within said crankcase at one end connected to said pump chamber, with its other end extending to adjacent the bottom of the pan and mounting an oil intake;
a screen retained within said oil intake;
an adapter supported upon said boss and sealed upon said mount flange, after draining accumulated oil from said crankcase and pan and removal of said basic filter;
a reservoir containing a flushing oil;
an outlet pipe extending into said reservoir tank having an inlet communicating with said flushing oil;
a first control valve connected to said outlet pipe;

said outlet pipe having an outlet connected to said adapter;

an air pipe connected to a pressurized air source and extending into said outlet pipe for feeding pressurized flushing oil through said adapter to the first outlet passage of said pump for communication with said pump chamber and for reverse flow and outletting through said pickup tube and through said intake screen for flushing said intake screen.

8. The method of flushing a vehicle oil pump pickup tube and filter without removing the crankcase pan comprises:

draining the oil from the crankcase and pan;

removing the conventional oil filter from its mount boss;

pressurizing a reservoir containing a flushing oil and having a connected feed pipe;

mounting an adapter at one end of said feed pipe onto the filter mount boss; and feeding pressurized flushing fluid through said adapter, through said oil pump and through the pickup tube and its screen.

* * * * *